United States Patent [19]

Johnson et al.

[11] Patent Number: 4,557,573
[45] Date of Patent: Dec. 10, 1985

[54] PHOTOSENSOR ARRANGEMENT FOR ENCODING LENS AND SHUTTER BLADE POSITION

[75] Inventors: Bruce K. Johnson, Andover; George D. Whiteside, Lexington, both of Mass.

[73] Assignee: Polaroid Corporation, Cambridge, Mass.

[21] Appl. No.: 594,130

[22] Filed: Mar. 28, 1984

[51] Int. Cl.[4] .......................... G03B 3/10; G03B 9/40
[52] U.S. Cl. .................................. 354/234.1; 354/246
[58] Field of Search .............................. 354/234.1, 246

[56] References Cited

U.S. PATENT DOCUMENTS

| | | | |
|---|---|---|---|
| 3,942,183 | 3/1976 | Whiteside | 354/436 |
| 4,167,316 | 9/1979 | Johnson et al. | 354/401 |
| 4,192,587 | 3/1980 | LaRocque et al. | 354/414 |
| 4,360,258 | 11/1982 | Hashimoto | 354/400 |
| 4,410,255 | 10/1983 | Hirohata | 354/234.1 |
| 4,426,145 | 1/1984 | Hashimoto | 354/234.1 |

Primary Examiner—L. T. Hix
Assistant Examiner—David M. Gray
Attorney, Agent, or Firm—Edward S. Roman

[57] ABSTRACT

A photographic exposure control system includes a dual purpose light sensing arrangement comprising a single photocell and light emitting diode pair which provide control signals indicative of both the focal position of a variable focus lens as well as the position in which the shutter blades first allow the transmission of scene light to the focal plane of the camera.

2 Claims, 7 Drawing Figures

PHOTOSENSOR ARRANGEMENT FOR ENCODING LENS AND SHUTTER BLADE POSITION

BACKGROUND OF THE INVENTION

1. Field of the Invention

This invention relates generally to a photographic exposure control system with a dual purpose light sensing arrangement and, more particularly, to a photographic exposure control system utilizing a single photocell and light emitting diode pair to provide control signals indicative of both objective lens focal position and shutter blade first light.

2. Description of the Prior Art

Photographic camera apparatus embodying shutter blade mechanisms of the scanning type as well as rotatable lens mechanisms which may be automatically focused in accordance with the determined camera-to-subject range are well known in the art and described in U.S. Pat. No. 4,192,587, entitled "Proportional Fill Flash", by A. G. LaRocque et al., issued Mar. 11, 1980, in common assignment herewith and now incorporated by reference herein. Such scanning shutter blade mechanisms are generally spring driven from a scene light blocking position toward a maximum aperture defining position and thereafter returned to the scene light blocking position upon energization of a solenoid. Such scanning shutter blade mechanisms generally comprise a pair of scanning shutter blade elements each having a primary aperture therethrough. The shutter blade elements overlap for reciprocal movement with respect to each other. This movement drives the primary apertures into overlapping relationship with each other so as to define a progressively increasing effective primary aperture. In the course of this displacement the shutter blade elements are driven through a position where the primary apertures in each blade first begin to overlap to allow the initial transmission of scene light to the camera focal plane. The instant that the scanning shutter blades reach the so-called first light position is important to determine accurately since other exposure influencing events such as the firing of an electronic flash are timed from that instant in a manner as is fully described in U.S. Pat. No. 4,192,587, supra.

Auto focus cameras of the aforementioned type generally embody a rotatably driven objective lens mechanism which must be stopped at an appropriate focal position corresponding to a previously determined camera-to-subject distance. In such systems it is desirable to provide a positive feedback signal to identify the instantaneous focal position of the lens mechanism as it is rotated through its plurality of different focal positions so that it may be stopped at the appropriate focal position corresponding to the determined camera-to-subject distance range.

Therefore, it is a primary object of this invention to provide a simple and economical light sensing arrangement for serving the dual purpose of sensing both the focal position of the objective lens mechanism and the first light position of the shutter blades.

It is a further object of this invention to provide a dual purpose light sensing arrangement comprising a single photocell and light emitting diode to provide control signals which are indicative of both the objective lens focal position and the shutter blade first light position.

Other objects of the invention will be in part obvious and will in part appear hereinafter. The invention accordingly comprises a mechanism and system possessing the construction, combination of elements, and arrangement of parts which are exemplified in the following detailed disclosure.

SUMMARY OF THE INVENTION

An exposure control system for an auto focus camera having means defining a focal plane comprises an objective lens arrangement together with means for mounting at least part of the objective lens arrangement for displacement between a plurality of focal positions. The objective lens arrangement is adapted to focus an image of a subject located at a different distance from the camera within a given range of distances at the focal plane of the camera at each of its focal positions. The mounting means comprises a plurality of spaced apart position encoding apertures which are also disposed for displacement in correspondence with the displaceable part of the objective lens arrangement. There is provided a shutter blade mechanism together with means for mounting the shutter blade mechanism for displacement between at least one arrangement wherein it blocks scene light from reaching the focal plane and another arrangement wherein it defines a maximum size aperture. The shutter blade mechanism serves to define a range of progressively increasing sized apertures for admitting scene light to the focal plane as it moves from its scene light blocking arrangement toward its maximum size aperture defining arrangement. Light emitting and sensing means are arranged with respect to the encoding apertures and the shutter blade mechanism to provide an output signal indicative of the position of the displaceable part of the objective lens arrangement and the position of the shutter blade mechanism. Control means respond to the output signal from the light emitting and sensing means for stopping the displacement of the objective lens arrangement at the appropriate focal position and for controlling another exposure influencing event. The light emitting and sensing means provide the output signal indicative of the shutter blade position at the instant that scene light is first transmitted by the blade mechanism to the focal plane of the camera.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figures 1, 7:
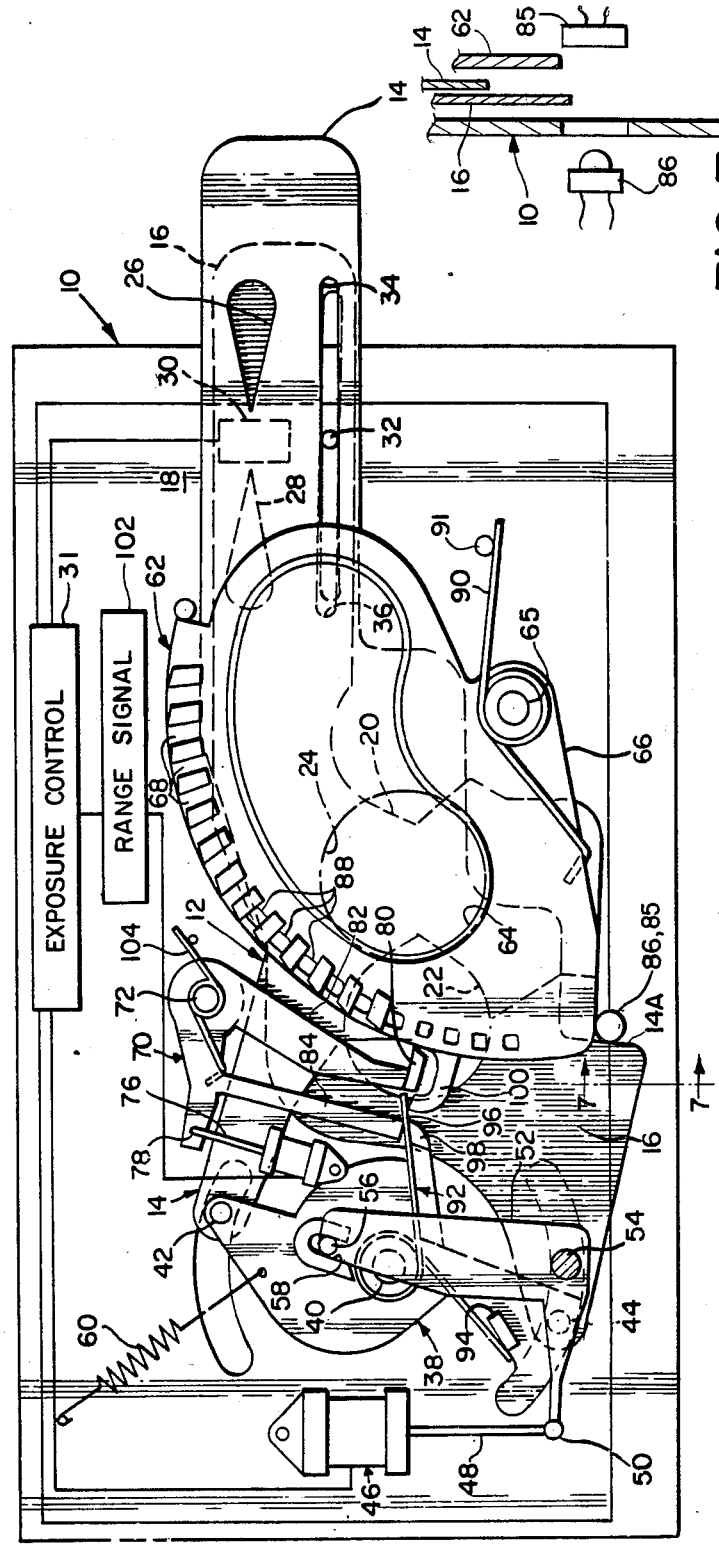
FIG. 1 is a front view of the exposure control system of this invention.
FIG. 7 is a cross-sectional view along the lines 7—7 of FIG. 1 showing the dual purpose light sensing arrangement of the invention.

Referring now to FIG. 1, there is shown at 10 a photographic exposure control system embodying the dual purpose light sensing control arrangement of this invention. A scanning type shutter blade mechanism as shown generally at 12 comprises two overlapping shutter blade elements 14 and 16 disposed for reciprocal sliding movement with respect to each other on a baseblock casting 18. The shutter blade elements 14 and 16 are provided, respectively, with a portion of a scene light admitting primary aperture 20 and an entire scene light admitting primary aperture 22 to collectively define a progressive variation of effective aperture openings in accordance with simultaneous longitudinal and lateral displacement of one blade element with respect to the other blade element in a manner as is fully described in U.S. Pat. No. 3,942,183, entitled "Camera with Pivoting Blades", by George D. Whiteside, issued Mar. 2, 1976, in common assignment herewith and now incorporated by reference herein. Although as is readily apparent only a portion of the scene light admitting aperture 20 is actually cut into the blade 14, it will hereinafter be referred to simply as primary aperture 20. The primary apertures 20 and 22 are selectively shaped so as to overlap a light entry exposure opening 24 in the baseblock casting 18 thereby defining a varying effective aperture size as a function of the position of the blade elements 14 and 16.

Each of the blades 14 and 16 may additionally be configured to have corresponding photocell sweep secondary apertures shown, respectively, at 26 and 28. Secondary apertures 26 and 28 may be configured in correspondence with the shapes of scene light admitting primary apertures 20 and 22. As is readily apparent, the secondary apertures 26 and 28 also move in correspondence with the primary apertures 20 and 22 to define a small secondary aperture for admitting the passage of scene light from the scene being photographed to a scene light detecting station as shown generally at 30. The scene light detecting station 30 includes a photoresponsive element (not shown) which provides a signal to a light integrating circuit in an exposure control circuit as shown generally at 31 which operates in a manner as is fully described in U.S. Pat. No. 4,192,587, supra. Thus, the exposure interval can be terminated as a function of the amount of light received through the secondary effective aperture defined by the overlapping photocell sweep apertures 26 and 28 in a manner as is fully described in U.S. Pat. No. 4,192,587, supra.

Projecting from the baseblock casting 18 at a location spaced laterally apart from the light entry exposure opening 24 is a pivot pin or stud 32 which pivotally and translatably engages elongate slots 34 and 36 formed in respective shutter blade elements 14 and 16. Pin 32 may be integrally formed with the baseblock casting 18, and blade elements 14 and 16 may be retained in engaging relation with respect to the pin 32 by any suitable means.

The opposite ends of the blade elements 14 and 16 respectively include extended portions which pivotally connect to a walking beam 38. The walking beam 38, in turn, is disposed for rotation relative to the baseblock casting 18 by pivotal connection to a projecting pivot pin or stud 40 which may also be integrally formed with the baseblock casting 18 at a location spaced laterally apart from the light entry exposure opening 24. The walking beam 38 may be pivotally retained with respect to the pin 40 by conventional means such as an E ring (not shown). In the preferred mode, the walking beam 38 is pivotally connected at its distal ends to the shutter blade elements 14 and 16 by respective pin members 42 and 44 which extend laterally outward from the walking beam 38.

Drive means are provided for displacing the blade mechanism and include a tractive electromagnetic device in the form of a solenoid 46 employed to displace the shutter blades 14 and 16 with respect to each other and the baseblock casting 18. The solenoid 46 includes an internally disposed cylindrical plunger 48 which retracts inwardly into the body of the solenoid upon energization of the solenoid winding. The outside end of the solenoid plunger 48 pivotally connects at 50 to a drive bell crank 52 which, in turn, is pivotally connected at 54 to a wall member (not shown) forward of the baseblock casting 18. The other side of the bell crank 52, in turn, includes an integral drive pin 56 extending laterally outward from the side thereof for sliding engagement in a slot or groove 58 integrally molded with respect to the walking beam 38. In this manner, the solenoid plunger 48 is connected to the walking beam 38 by way of the bell crank 52 so that vertical displacement of the plunger 48 will operate to rotate the walking beam 38 around the pivot pin 40 so as to appropriately displace the shutter blades 14 and 16.

Figure 5:
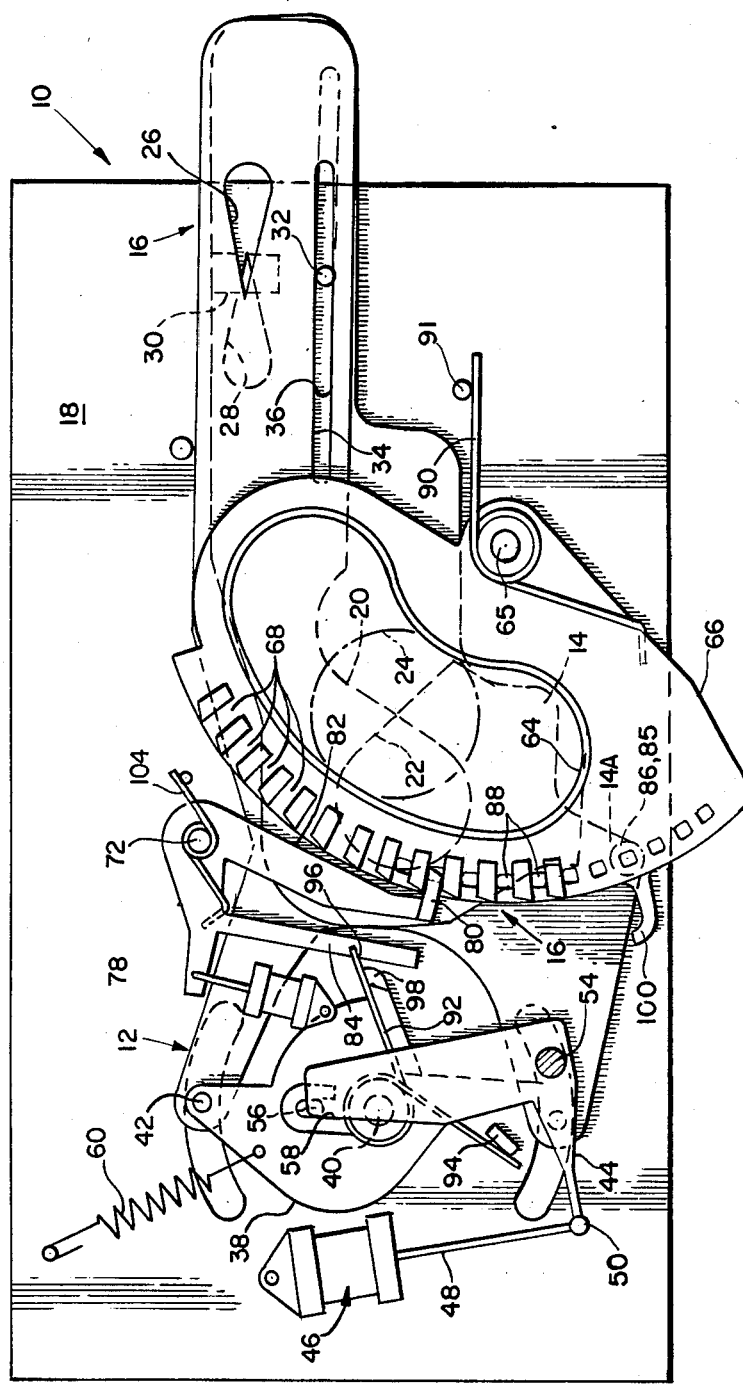
FIG. 5 is a front view of the exposure control system of FIG. 1 showing some components thereof in still another operative position.

This drive means may additionally include a tension spring 60 connected between the baseblock casting 18 and the walking beam 38 so as to continuously urge the walking beam 38 to rotate in a counterclockwise direction as viewed in FIG. 1 thereby also continuously urging the blade elements 14 and 16 into positions defining their largest effective aperture opening over the light entry exposure opening 24 as best seen in FIG. 5. As will be readily understood, in some shutter blade arrangements it may be preferable to utilize a compression spring in place of the tension spring 60 in a manner as is shown in U.S. Pat. No. 4,167,316, entitled "Sonar Controlled Lens Focus Apparatus", by Bruce K. Johnson et al., issued Sep. 11, 1979, in common assignment herewith and now incorporated by reference herein.

An objective lens assembly as shown generally at 62 preferably comprises a variable focus lens element 64 disposed within a holding member 66 for rotation about a pivot pin 65 fixedly connected with respect to the baseblock casting 18. As will be readily understood, the objective lens assembly 62 may comprise other lens elements (not shown) in fixed optical alignment with respect to the light entry exposure opening 24 and the variable focus lens element 64. The lens holding member 66 thus may be rotated between a plurality of focal positions wherein the objective lens assembly 62 is adapted to focus an image of a subject located at a different distance from the camera within a given range of distances at the focal plane (not shown) of the camera for each of its focal positions. The variable focus lens element 64 herein described is the invention of another and the subject of copending patent application Ser. No. 566,311, entitled "Analytic Function Optical Component", by J. Baker et al., filed Dec. 28, 1983 in common assignment herewith. As will be readily apparent, it may be replaced by a plurality of spaced apart discrete lens elements in a manner as is fully described in U.S. Pat. No. 4,167,316, supra. The lens holding member 66 includes a plurality of spaced apart integral slots or grooves 68 disposed about the periphery thereof which correspond to the number of different focal positions to which the lens assembly 62 may be set as will become apparent from the following discussion.

A latch pawl as shown generally at 70 is disposed for rotation with respect to the baseblock casting 18 by a pivot pin 72. Drive means are provided for displacing the latch pawl 70 and include another tractive electromagnetic device in the form of another solenoid 74 which also includes an internally disposed cylindrical plunger 76 which retracts inwardly into the body of the solenoid upon energization of the solenoid winding. The outer end of the plunger 46 pivotally connects at 78 to the latch pawl 70. The latch pawl 70 comprises a first integral elongated finger 82 extending outwardly from the pivot 72 to an integral latch tang 80 which may be slidably engaged within the grooves 68 in a manner to be subsequently described. The latch pawl 70 further comprises a resilient elongated integral second finger 84 which extends outwardly from the pivot 72 in generally parallel relationship with respect to the first finger 82 for engagement with the walking beam 38 also in a manner to be subsequently described herein.

The dual purpose light sensing control arrangement of this invention comprises a photoresponsive element (photocell) 85 and an infrared emitting diode (IRED) 86 as best shown in the cross-sectional view of FIG. 7. The photocell 85 and IRED 86 are stationed in spaced apart relation and optical registration with respect to each other on opposite sides of the path of displacement of the lens holding member 66 and shutter blade elements 14 and 16. The lens holding member 66 also includes a plurality of spaced apart position encoding apertures 88 disposed about the periphery thereof inside respective slots or grooves 68. Thus, counterclockwise rotation of the lens holding member 66 as viewed in FIG. 1 operates to drive the position encoding apertures 88 between the photocell 85 and IRED 86 so as to enable the photocell 85 to provide an output signal pulse count to the exposure control 31 indicative of the lens holding member 66 position. As is readily apparent, each output pulse from the photocell 85 is provided when a respective one of the position encoding apertures 88 passes between the photocell 85 and IRED 86.

The lens holding member 66 is also resiliently biased to rotate in a clockwise direction as viewed from FIG. 1 by a biasing leaf spring 90 disposed about the pivot pin 65 with one end thereof resiliently engaged against a stop pin 91 from the baseblock casting 18. Drive means are provided for rotating the lens holding member 66 in a counterclockwise direction against the resilient bias of the leaf spring 90 by a lens drive leaf spring 92 one end of which engages an integral stop member 94 from the walking beam 38 and the other end of which engages another integral stop member 98 from the walking beam 38. The outer end of the lens drive leaf spring 92 as shown at 96 is cantilevered beyond the stop 98 and operates to drive the lens holding member 66 by engaging an integral drive arm 100 extending radially outward from the lens holding member 66. The lens drive spring arrangement herein described is the invention of another and the subject of copending patent application Ser. No. 581,539, entitled "Lens Drive for Auto Focus Camera", by Bruce K. Johnson and George D. Whiteside, filed Feb. 21, 1984. Although the lens drive arrangement is preferred, it may nevertheless be replaced with a conventional lens drive arrangement as taught in U.S. Pat. No. 4,192,587, supra.

Operation of the above-described exposure control system may commence in the usual manner upon the depression of an exposure cycle initiation button (not shown) as is fully described in U.S. Pat. No. 4,192,587, supra. The exposure control system 10 preferably comprises an automatic ranging system which provides a range signal corresponding to the camera-to-subject distance range. The automatic ranging system may be of the sonic type as is fully described in U.S. Pat. No. 4,192,587, supra, and thereby provide the range signal to a range signal circuit as shown generally at 102.

Figure 2:
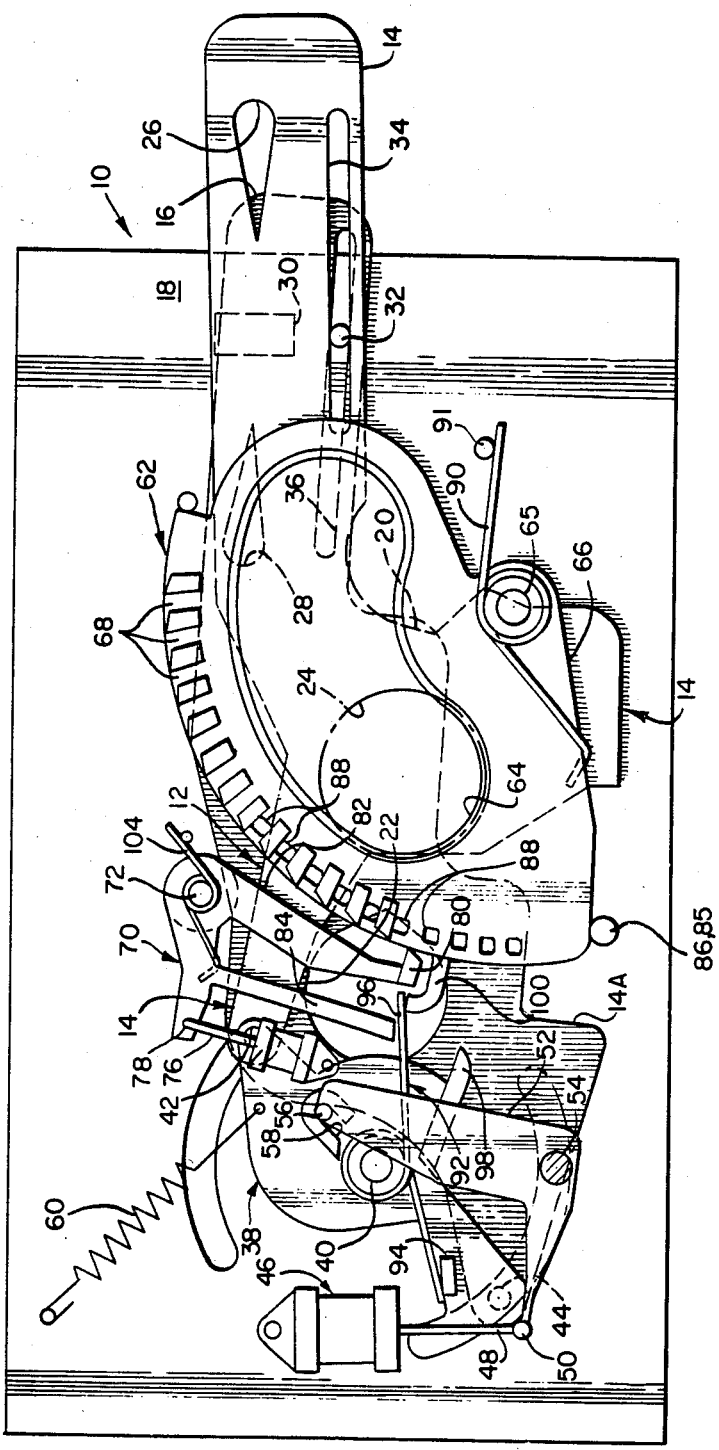
FIG. 2 is a front view of the exposure control system of FIG. 1 showing some components thereof in another operative position.
Figure 3:
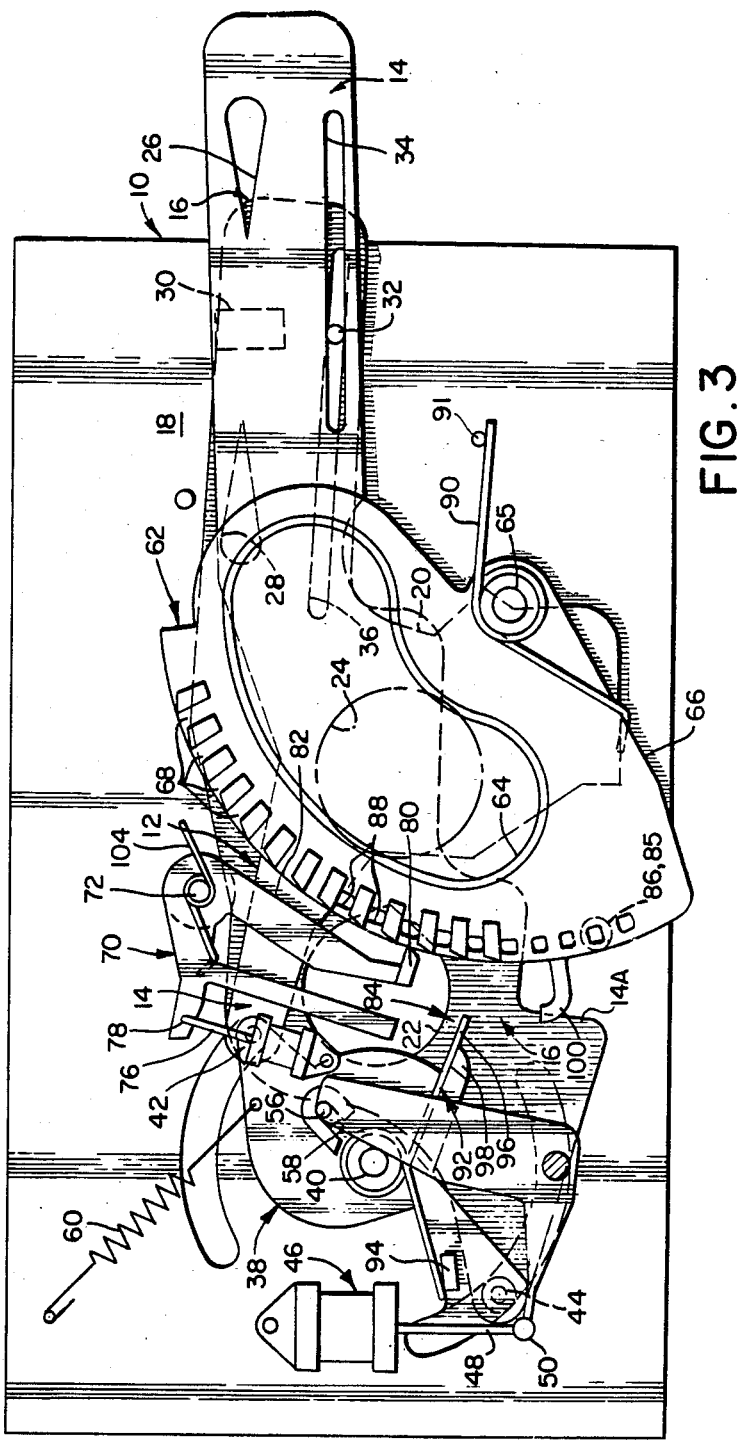
FIG. 3 is a front view of the exposure control system of FIG. 1 showing some components thereof in still another operative position.

After the operation of the automatic rangefinder and the provision of the range signal corresponding to the determined camera-to-subject distance range in the aforementioned manner, solenoid 46 is energized so as to retract the plunger 48 thereof inwardly into the solenoid winding and thereby rotate the bell crank 52 in a clockwise direction so as to simultaneously rotate the walking beam clockwise about its pivot 40 from its position as shown in FIG. 1 to its position as shown in FIG. 2. As is now readily apparent, this limited rotation of the walking beam 38 operates initially to further tension the lens drive spring 92 since the lens driving end 96 of the spring 92 cannot respond quickly enough to keep up with the stop member 98. After the walking beam 38 is driven to its position as shown in FIG. 2, the lens drive spring 92 unwinds so as to rotate the drive end 96 thereof in a clockwise direction from its position as shown in FIG. 2 to its position as shown in FIG. 3 thereby also simultaneously engaging the drive arm 100 so as to set the lens holding member 66 into counterclockwise rotation against the resilient bias of its return spring 90. Thus, the untensioning of the drive spring 92 operates to drive the lens holding member 66 and its associated variable focus lens element 64 through its plurality of focal positions.

Figure 4:
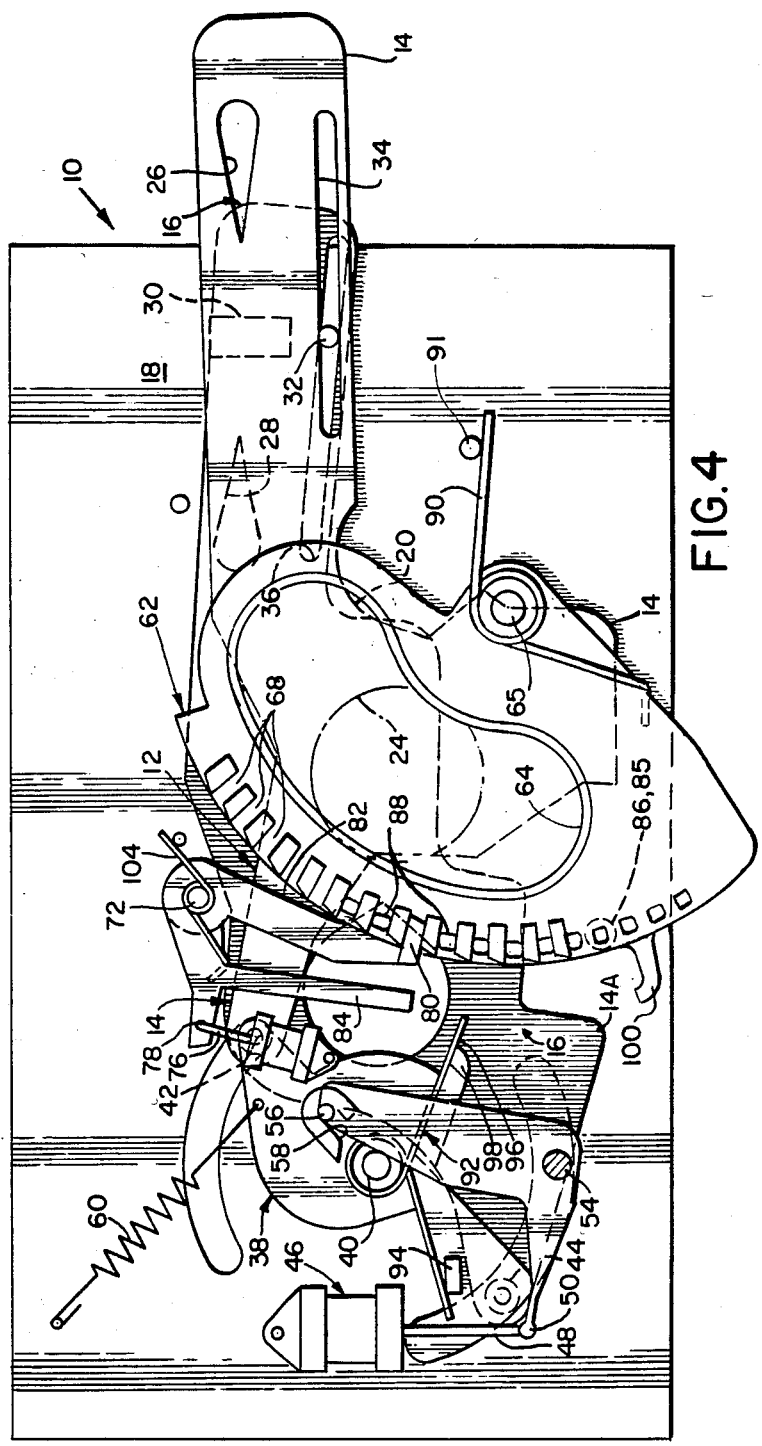
FIG. 4 is a front view of the exposure control system of FIG. 1 showing some components thereof in still another operative position.
Figure 6:
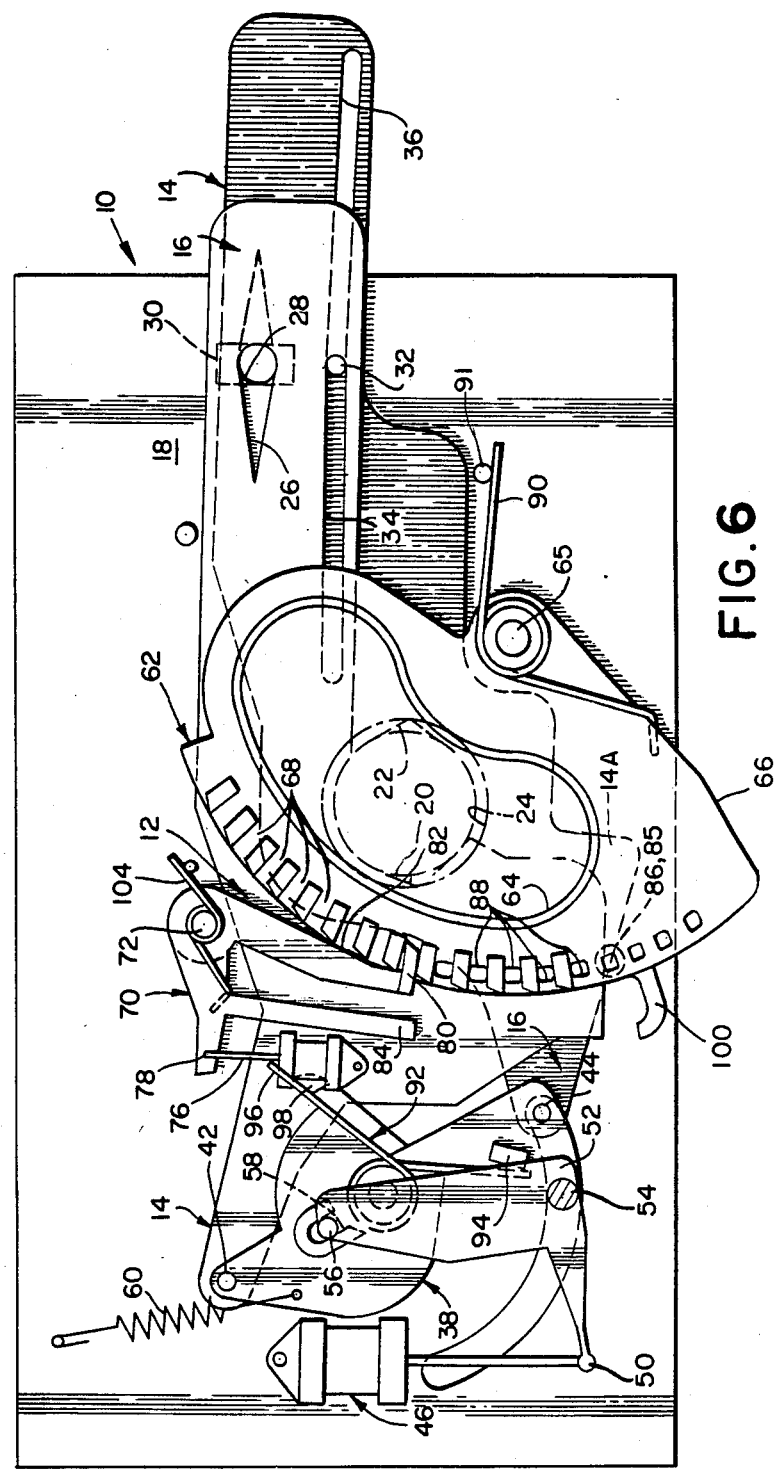
FIG. 6 is a front view of the exposure control system of FIG. 1 showing some components thereof in still another operative position.

When the output pulse count from the photocell 85 and IRED 86 light sensing control arrangement of this invention indicates that the lens element 64 has reached a focal position corresponding to the determined camera-to-subject distance as represented by the range signal, the circuit 102 operates to energize the solenoid 74 so as to retract the plunger 76 inwardly into the winding thereof. This, in turn, operates to rotate the latch pawl 70 in a counterclockwise direction about the pivot pin 72 so as to drive the latch tang 80 into the appropriate groove 68 and stop the rotation of the lens holding member 66 at the appropriate focal position corresponding to the previously determined camera-to-subject distance range. After the latch pawl 70 has been rotated into its lens latching position as shown in FIG. 4 in the aforementioned manner, the solenoid 46 is deenergized so as to allow the walking beam 38 to be rotated in a counterclockwise direction under the driving influence of tension spring 60 thereby driving the shutter blade elements 14 and 16 from their scene light blocking arrangement as shown in FIG. 4 toward their maximum aperture size defining position as shown at FIG. 6.

In the course of this displacement, the shutter blade elements 14 and 16 are driven to a position as shown in FIG. 5 where the primary apertures 20 and 22 first begin to overlap to allow the initial transmission of scene light to the camera focal plane (not shown). The instant that the shutter blades 14 and 16 reach this so-called first light position is important to determine accurately since other exposure influencing events, such as the firing of an electronic flash (not shown), are timed from that instant in a manner as is fully described in U.S. Pat. No. 4,192,587, supra. The leading edge of the shutter blade element 14 as shown at 14A is configured to intervene between the photocell 85 and IRED 86 so as to block the transmission of infrared light from the IRED 86 to the photocell 85 at the precise instant that the primary apertures 20 and 22 first begin to overlap to initially transmit scene light to the camera focal plane. Since the lens holding member 66 was previously latched at the appropriate focal position, a corresponding one of the position encoding apertures 88 is aligned between the photocell 85 and IRED 86 so as to transmit infrared radiation from the IRED 86 to the photocell 85 immediately prior to the shutter blade elements 14 and 16 reaching the so-called first light position of FIG. 5. Thus, the intervention of the leading edge 14A of the shutter blade element 14 between the photocell 85 and IRED 86 operates to block the transmission of infrared radiation to the photocell 85 and thereby change the output signal level therefrom to provide a signal indicative of the instant that the shutter blade elements 14 and 16 first overlap to initially transmit scene light to the camera focal plane. Thus in this manner, there is provided the dual purpose light sensing arrangement of this invention in which a single photocell 85, IRED 86 pair provide control signals indicative of both objective lens focal position and shutter blade first light.

Upon the determination of the correct exposure by the scene light detecting station 30 and exposure control circuit 31 in a manner as is fully described in U.S. Pat. No. 4,192,587, supra, there is applied a control signal operative to energize the solenoid 46 and withdraw the plunger 48 therein so as to rotate the walking beam 38 in a clockwise direction from its scene light admitting position as shown in FIG. 5 back to its scene light blocking position as shown in FIG. 4. Upon the termination of the exposure cycle and the rotation of the walking beam 38 back to its scene light blocking position as shown in FIG. 4, there is provided a control signal operative to deenergize the solenoid 74 thereby allowing the latch pawl 70 to be rotated in a clockwise direction about its pivot pin 72 under the urging influence of a drive leaf spring 104 back to its original position as shown in FIG. 3. The lens holding member 66 is thereafter rotated back to its original position as shown in FIG. 2 under the driving influence of its return spring 90. A control signal is thereafter provided to deenergize the solenoid 46 so as to allow limited rotation of the walking beam 38 in a countrclockwise direction under the biasing influence of its drive spring 60 so as to drive the stop member 98 into engagement with the end of the elongated second finger 84 of the latch pawl 70. In this manner, the walking beam 38 is latched to a position as shown in FIG. 1 so as to be maintained in its scene light blocking arrangement indefinitely without continued energization of either solenoid 46 or 74.

Other embodiments of the invention including additions, subtractions, deletions, and other modifications of the preferred disclosed embodiments of the invention will be obvious to those skilled in the art and are within the scope of the following claims.

What is claimed is:

1. An exposure control system for an auto focus camera having means for defining a focal plane comprising:
   an objective lens arrangement;
   means for mounting at least part of said objective lens arrangement for displacement between a plurality of focal positions, said objective lens arrangement being adapted to focus an image of a subject located at a different distance from said camera within a given range of distances at the focal plane of said camera at each of its said focal positions, said mounting means also comprising a plurality of spaced apart position encoding apertures disposed for displacement in correspondence with said displaceable part of said objective lens arrangement;
   a shutter blade mechanism;
   means for mounting said blade mechanism for displacement between at least one arrangement wherein it blocks scene light from reaching the focal plane and another arrangement wherein it defines a maximum size aperture, said blade mechanism serving to define a range of progressively increasing sized apertures for admitting scene light to the camera focal plane as it moves from its said scene light blocking arrangement toward its maximum size aperture defining arrangement;
   light emitting and sensing means comprising a light emitting diode and a photoresponsive element stationed in spaced apart relation with respect to each other on the opposite sides of the path of displacement of said encoding apertures and said shutter blade mechanism for providing an output signal indicative of the position of said displaceable part of said objective lens arrangement when the light emitted by said light emitting diode is transmitted to said photoresponsive element by way of said encoding slots and the position of said shutter blade mechanism at the instant that scene light is first transmitted to the focal plane when said shutter blade mechanism operates to block the transmission of light from said light emitting diode to said photoresponsive element upon its displacement therebetween; and
   control means responsive to said output signal from said light emitting and sensing means for stopping the displacement of said objective lens arrangement at the appropriate focal position and for controlling another exposure influencing event.

2. The control system of claim 1 wherein said light emitting diode emits infrared light.

* * * * *